July 21, 1931.  G. R. LAWRENCE  1,815,306
AIR SYSTEM
Filed April 23, 1926  6 Sheets-Sheet 1

INVENTOR.
Geo. R. Lawrence
BY Fred Gerlach
his ATTORNEYS.

July 21, 1931.  G. R. LAWRENCE  1,815,306
AIR SYSTEM
Filed April 23, 1926   6 Sheets-Sheet 3

INVENTOR.
Geo. R. Lawrence
BY Fred Gerlach
his ATTORNEYS.

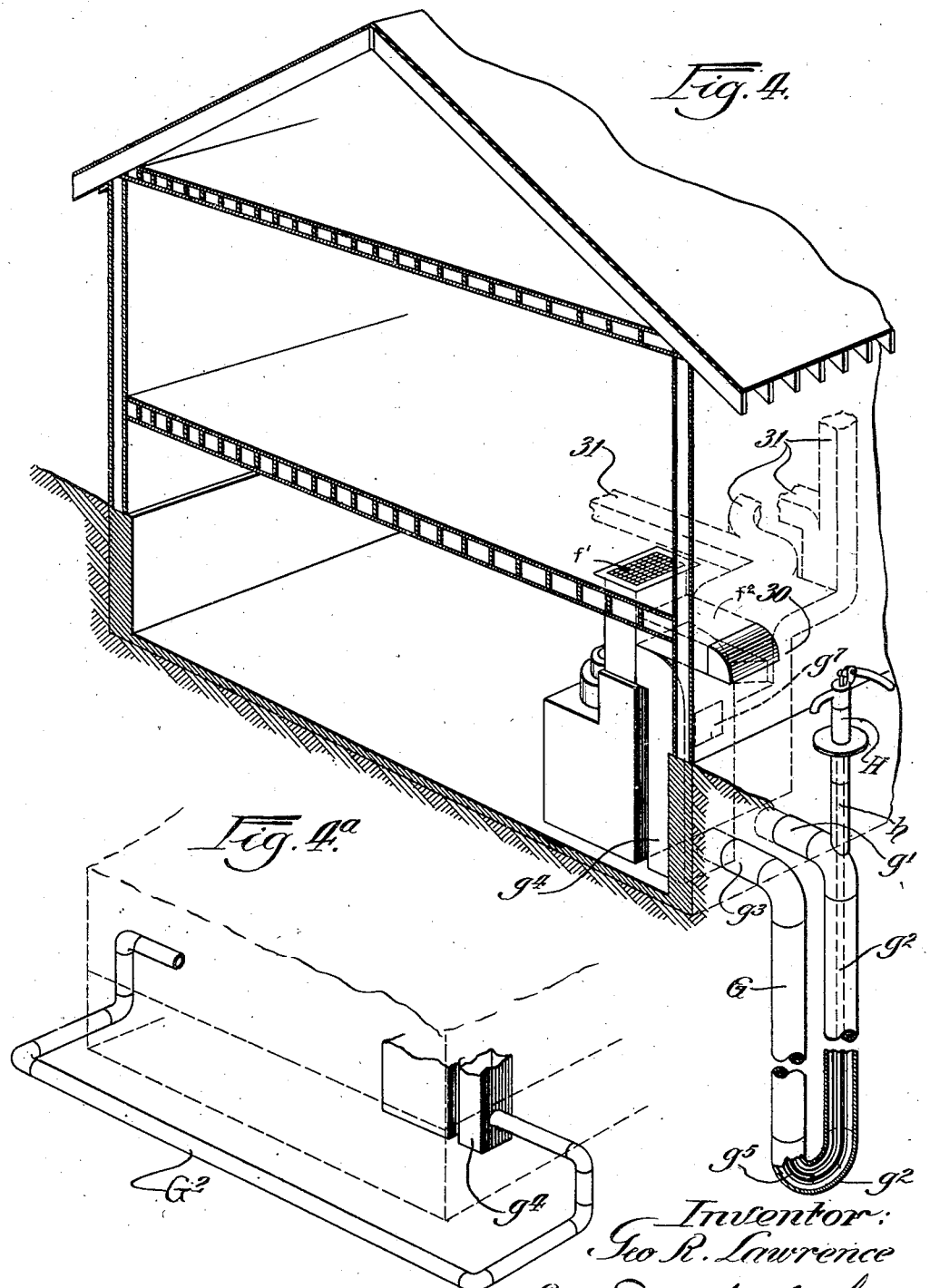

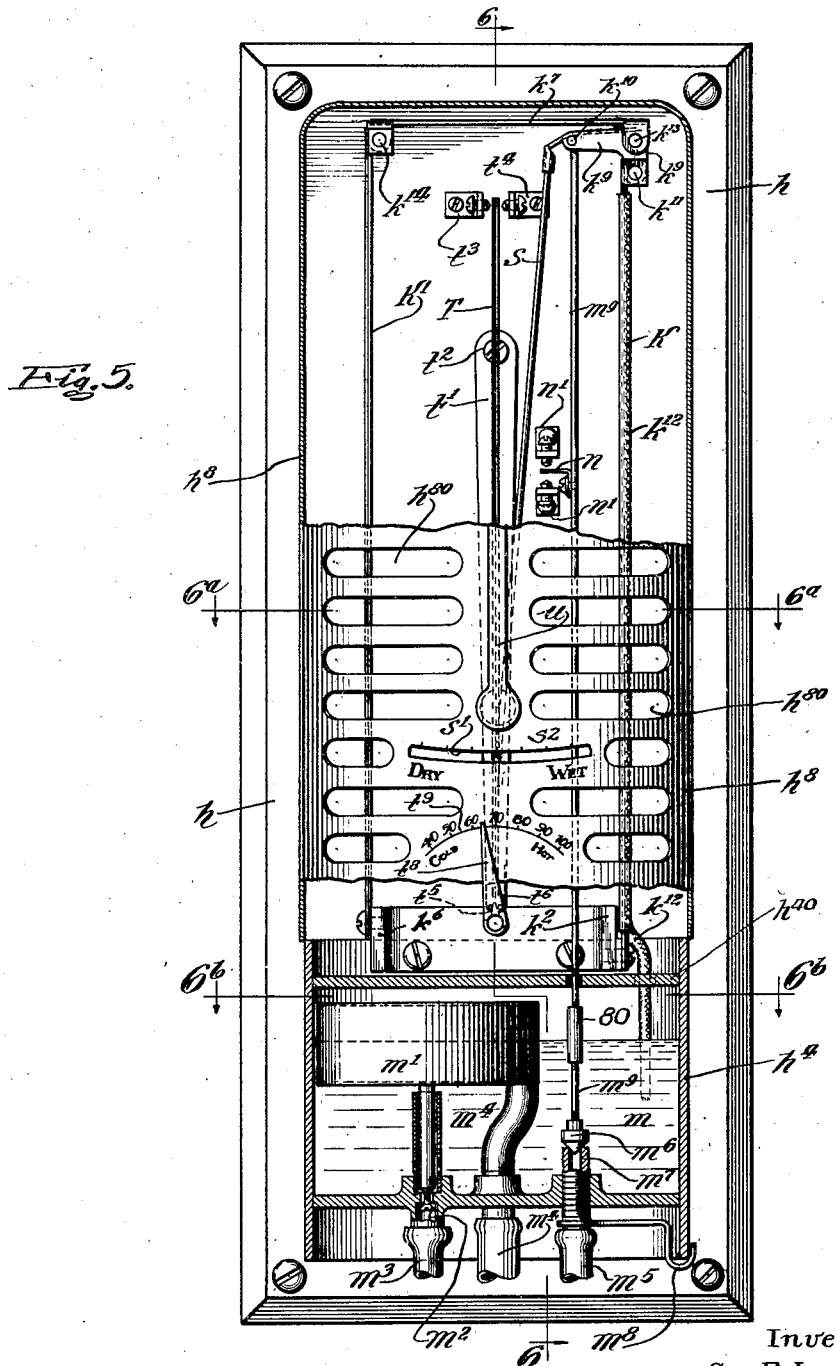

July 21, 1931.  G. R. LAWRENCE  1,815,306
AIR SYSTEM
Filed April 23, 1926  6 Sheets-Sheet 6
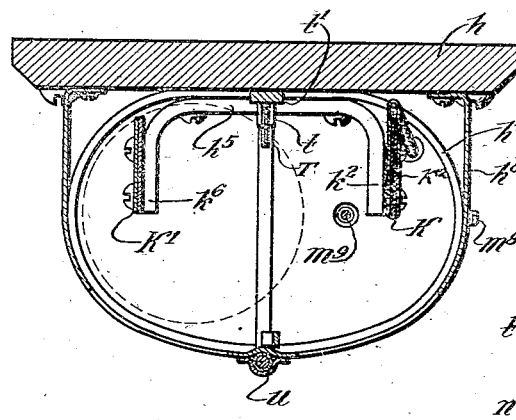
Fig. 6ᵃ
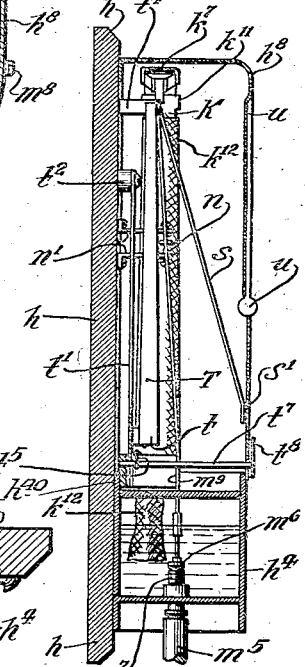
Fig. 6.
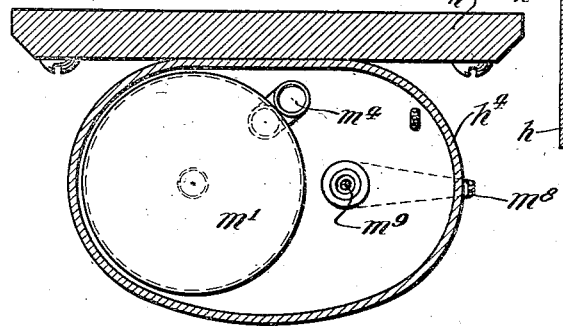
Fig. 6ᵇ
Inventor
Geo. R. Lawrence
By Fred Gerlach
Atty.

Patented July 21, 1931

1,815,306

UNITED STATES PATENT OFFICE

GEORGE R. LAWRENCE, OF CHICAGO, ILLINOIS, ASSIGNOR TO LAWRENCE DEVELOPMENT CO., OF DETROIT, MICHIGAN, A CORPORATION OF MICHIGAN

AIR SYSTEM

Application filed April 23, 1926. Serial No. 104,243.

The invention relates to air supplying systems.

One object of the invention is to provide an improved system for supplying pure air of proper humidity to buildings and the like.

Another object of the invention is to provide an improved system for supplying air, in which provision is made for automatically regulating the humidity of the air.

Another object of the invention is to provide an improved system which is adapted to be used either for supplying hot or cold air to buildings.

Another object of the invention is to provide a simple and efficient air supply system which is adapted for installation in houses.

Another object of the invention is to provide an improved air supply system, in which provision is made for purifying the air by removing particles of soot, products of combustion and the like from the air.

Another object of the invention is to provide an improved system in which the air is thoroughly washed and cleaned before it is delivered to the distributing duct for use.

Other objects of the invention will appear from the detail description.

The invention consists in the several novel features hereinafter set forth and more particularly defined by the claims at the conclusion hereof.

Figure 1:
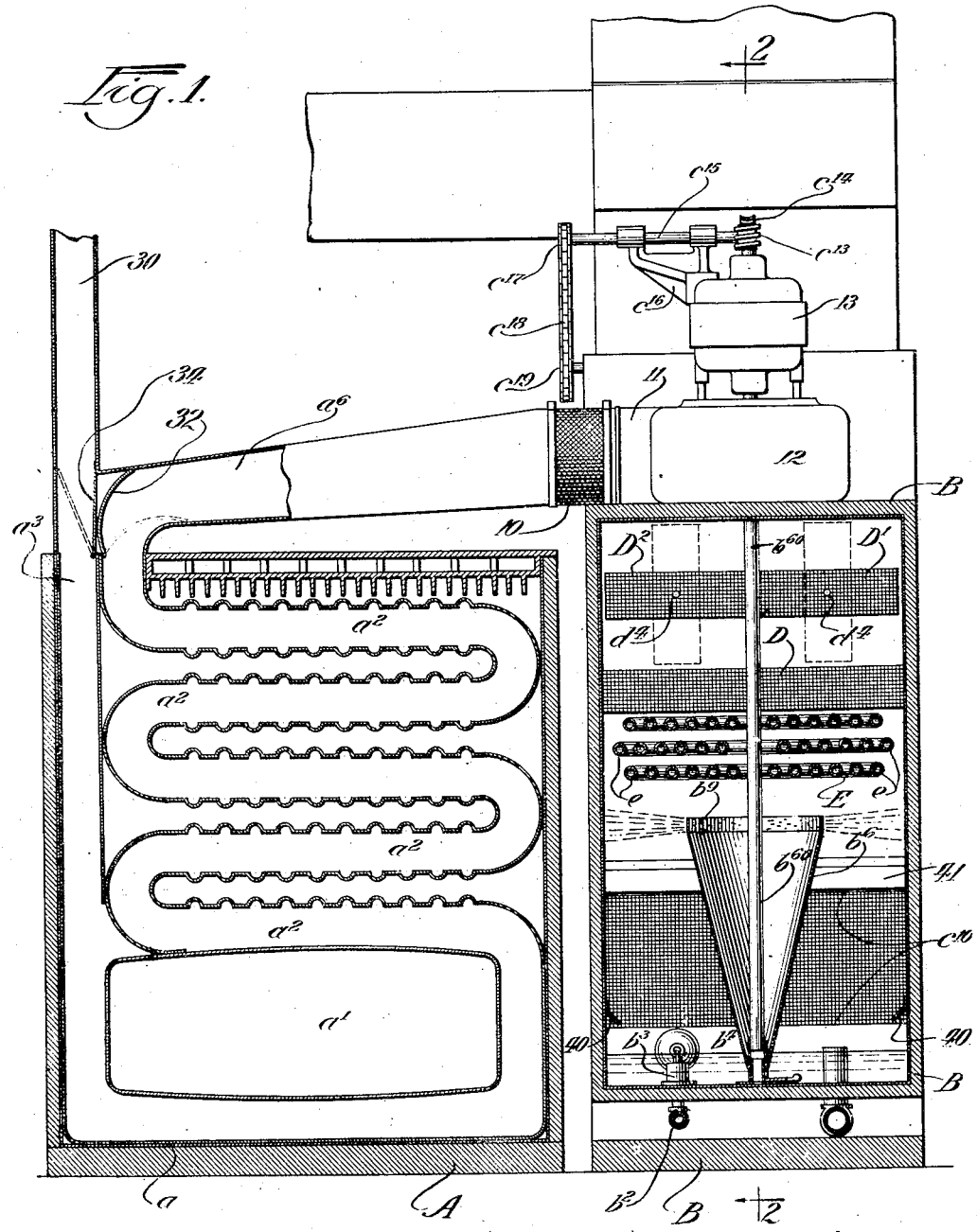
Figure 2:
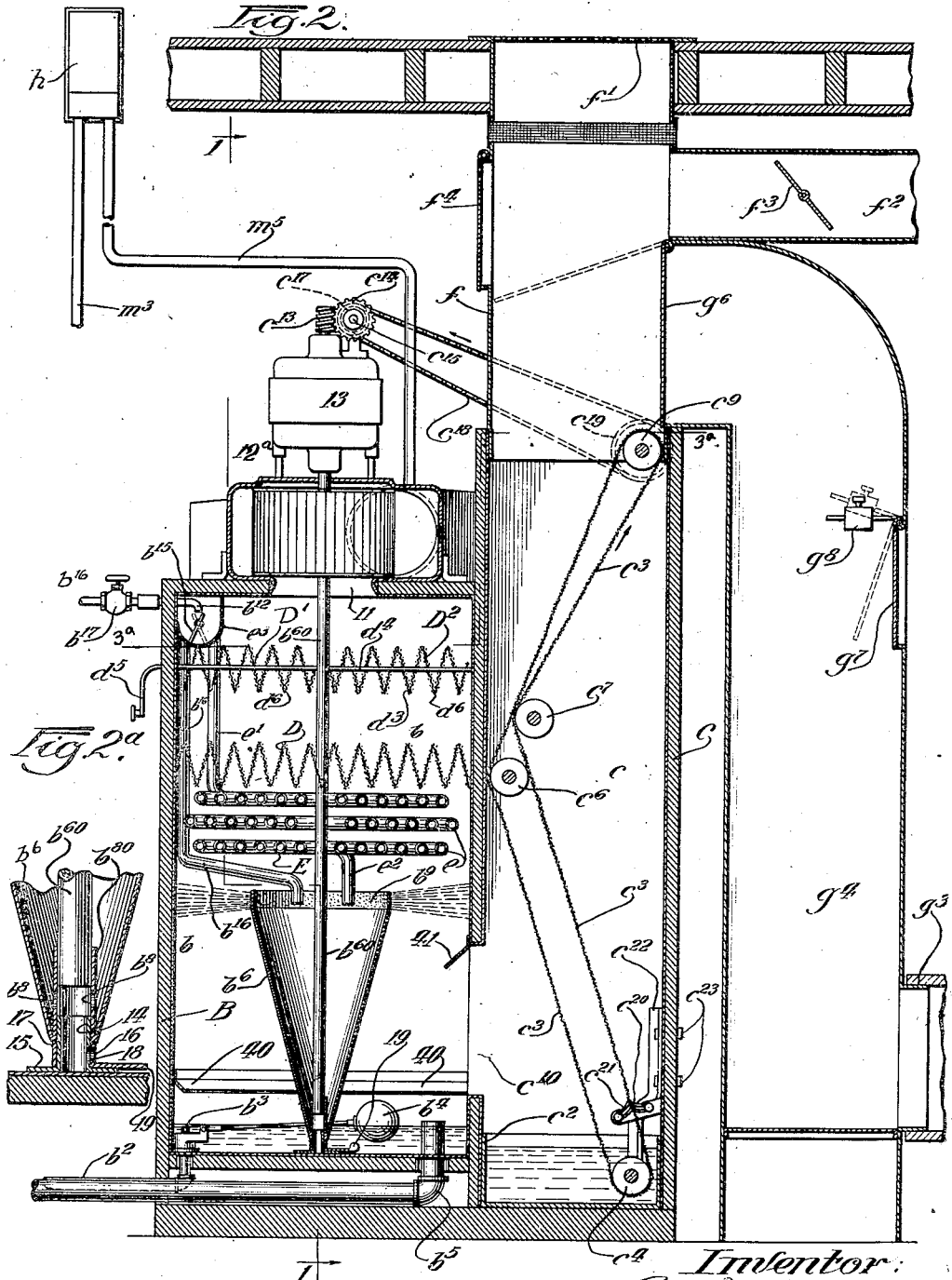
Figure 3:
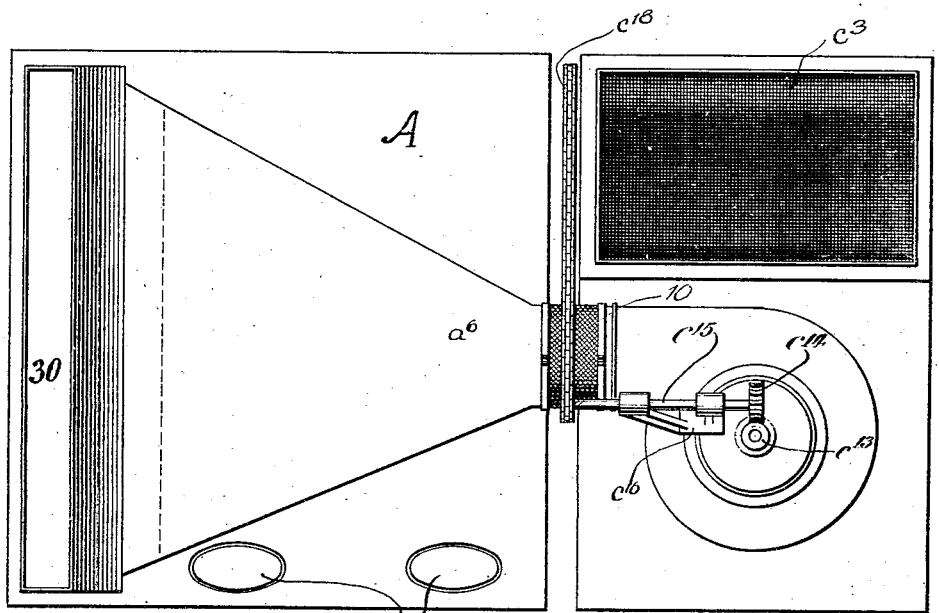
Figure 3A:
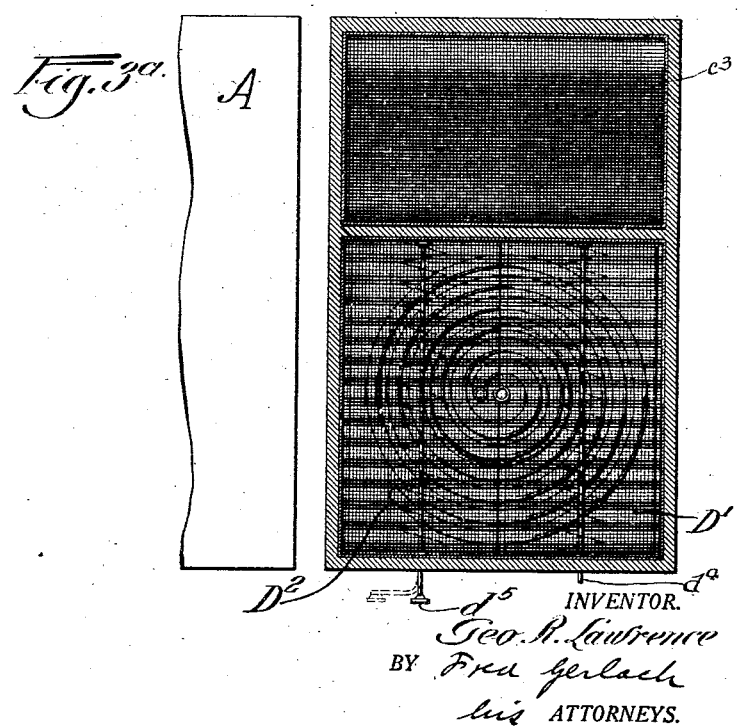

In the drawings: Fig. 1 is a vertical section through the washing apparatus and heater. Fig. 2 is a vertical section taken on line 2—2 of Fig. 1. Fig. 2ª is a detail, illustrating the lower end of the distributing drum for projecting water across the path of the air. Fig. 3 is a plan of the heater, washer and purifier. Fig. 3ª is a section taken on line 3ª—3ª of Fig. 2. Fig. 4 is a perspective, showing the system applied to a building. Fig. 4ª is a perspective of a modification of a pipe for delivering cooled air to the air purifying apparatus. Fig. 5 is a view partly in elevation and partly in section of the humidity regulating instrument. Fig. 6 is a section taken on line 6—6 of Fig. 5. Fig. 6ª is a section taken on line 6ª—6ª of Fig. 5. Fig. 6ᵇ is a section on line 6ᵇ—6ᵇ of Fig. 5.

The invention is exemplified in a system which embodies an air heater A which comprises a casing $a$; a fire box $a'$ for any suitable fuel, usually gaseous fuel or oil; a serpentine air-duct $a^2$, which is connected to receive air from trunk $a^6$, and extends back and forth in the upper portion of said casing and around the fire box; and an air outlet $a^3$, extending upwardly from the lower end of the duct $a^2$ below the fire box to a delivery trunk 30. The products of combustion from the fire box $a'$ are conducted around the several loops of the duct $a^2$ and transversely thereto and to outlets not shown which are connected to discharge into a chimney. The particular construction of the heater shown is more fully set forth in an application filed by me September 16, 1925, Serial No. 56,759.

Trunk 30 is connected to any suitable number of branches 31, to distribute the air to the different rooms or points where the air is to be delivered. The invention also contemplates the distribution of unheated air through ducts 31 when cool air is desired, and for this purpose a valve 32 is pivoted so it can be swung into closed position, as shown by dotted lines in Fig. 1, to close the heater duct $a^2$, and a valve 34 which is pivoted so it may be swung into position to conduct air directly from trunk $a^6$ into the trunk 30 when valve 32 is closed. This adapts the system for supplying air without passing it through the heater, when cool air is to be distributed.

Trunk $a^6$ has an end which terminates at, and is connected to, a flexible tubular pipe-section 10, which is connected to the outlet 11 of a blower 12, which forces air through the trunk $a^6$, duct $a^2$ and through the outlet $a^3$ to the distributing ducts 31. The blower 12 is driven by an electric motor 13, which is mounted on top of the casing of the blower. The blower casing is mounted on the top of the casing B of an air washer, which is separate from the heater-casing $a$. This flexible pipe section 10, between the blower and the trunk $a^6$, prevents the vibrations or noise, caused by the motor and blower, from being transmitted to the heater and their conduction to the air-distributing system of the building.

Air inlet trunk $f$ is connected to deliver air into the casing C of an air purifier, from which it passes through the washer to the blower 12. In practice, it is desirable to mix fresh air from the outside with the return air from the building into which the system discharges air, and for that purpose, trunk $f$ is connected to receive air from a register $f'$ located at any convenient point, such as the floor of one of the rooms, and from a branch $f^2$, which is extended to receive air from the outside of the building under control of a valve $f^3$. A hinged door $f^4$ is adapted to admit air to the trunk $f$ from the basement of the building, when that is desired. This construction permits fresh air to be mixed with the return air in desired proportion, to keep the air in suitable condition for use in the building.

When the system is to be used for supplying cool air to the building, for example, in hot weather when the heater is not used, it is desirable to receive air from as cool a source as possible, and for this purpose a pipe G of suitable material of high thermal conductivity, such as copper, has one of its ends $g'$ connected to receive air from the basement. Pipe G has a vertical loop $g^2$, which may be extended downwardly into the ground to a sufficient depth where the ground is cool, so the temperature of the air will be lowered materially by its passage therethrough. This pipe is preferably provided with longitudinal cooling fins $g^5$. The other upper end of the loop is connected, as at $g^3$, to deliver air into a duct $g^4$, which is connected to discharge into the inlet trunk $f$. A pump H is connected to an inlet pipe $h$ which extends into the lower portion of the loop pipe G, so that the water condensate may be pumped out. To prevent restriction of the air supply, in event that the cooling loop $g^2$ is of insufficient capacity or becomes clogged, a valve $g^7$ is provided, which is normally held closed by a weight $g^8$, and is adapted to automatically open and admit air from the basement, if and when suction pressure in duct $g^4$ becomes excessive as the result of stoppage in pipe G. A hinged valve $g^6$, which is held closed when the cooling pipe G is not used, may be swung into position shown by dotted lines in Fig. 2 to deliver cool air through duct $g^4$ into trunk $f$. Air may also be advantageously drawn from this underground pipe in winter when the temperature overground is materially lower than the underground temperature.

In lieu of extending a loop of pipe vertically into the ground, it may be extended horizontally around the building and in the ground, as at $G^2$ in Fig. 4ª.

In practice, it has been found that air in many places contains soot or other products of combustion and other impurities, and a purifier is illustrated which may, if desired, be used with the washer, to eliminate these before the air passes to the washer. This purifier comprises a vertical chamber $c$ in a casing C, integrally built with the washer casing B. Air enters the upper end of the chamber $c$ from trunk $f$ and is drawn downwardly to and through inlet $c^{10}$ to the washer by the blower 12 which is driven by an electric motor 13.

A pan $c^2$ at the bottom of the casing C contains a quantity of liquid, preferably a paraffine oil. An endless belt $c^3$ of fine wire netting is of sufficient width to extend completely across the width of chamber $c$ and extends around a roller $c^4$ which is submerged in the liquid or oil in pan $c^2$, so that the travelling endless belt will receive a bath. From roller $c^4$, both reaches of the belt extend obliquely upward across the chamber $c$, and are guided by a pair of rollers $c^6$, $c^7$ respectively. From said rollers, both reaches of the belt extend obliquely upward and reversely across the chamber to a drive-pulley $c^9$. As a result of this arrangement, the air must pass through the belt four times in transit through the chamber $c$ to the inlet $c^{10}$ of the casing. Pulley $c^9$ is constantly driven by gearing comprising a worm $c^{13}$ fixed to and driven by the shaft of motor 13; a worm gear $c^{14}$ driven by said worm and fixed to a shaft $c^{15}$ which is mounted in bearings on a bracket $c^{16}$ fixed to the top of the casing of the electric motor 13; a sprocket-wheel $c^{17}$, fixed to shaft $c^{15}$; a sprocket-wheel $c^{19}$ fixed to one end of the shaft pulley $c^9$ which projects from one side of the casing; and a sprocket-chain $c^{18}$ between sprockets $c^{17}$ and $c^{19}$.

Brushes $c^{20}$, $c^{21}$ may be applied to the opposite faces of the reach of the belt passing away from the roller $c^4$, to wipe the excess oil and any impurities adhering thereto from the belt. Roller $c^4$ and said brushes are mounted in a frame $c^{22}$ which is suitably mounted on one of the walls of the casing $c$, so that the roller and belt may be lifted out of the oil-bath to permit the pan $c^2$ to be conveniently removed when the oil has become dirty and it is desired to replace it with a fresh supply. This frame is held in its lowered position by bolts $c^{23}$ which may be loosened and tightened from the outside when the frame is to be raised or lowered, or the frame may be left loose so the weight of roller $c^4$ will act to keep the belt taut.

In operation, the constantly travelling belt $c^3$, in passing around roller $c^4$, will be immersed in oil, and any excess of oil will be wiped from it by brushes $c^{20}$, $c^{21}$, so that the belt, in travelling back and forth across the chamber $c$ will have thereon a film of oil, to which soot and other products or particles in the air will adhere. The air, entering the top of chamber $c$, passes successively through the upper oppositely travelling reaches of the belt and then through the oppositely travelling lower reaches, so that it must repeatedly pass through the belt in transit through the casing to eliminate the particles in the air which have an affinity for the liquid used on the screen. A characteristic of forcing the air through the chamber, with fine woven wire screen extending across it, is that every time the air laden with particles strikes against the upwardly facing portions of the fine round wires forming the screen, it will be deflected and divided thereby and then pass through the openings between the wires. This causes the air, in passing through the meshes, to form eddies and low pressure areas adjacent the opposite or downwardly facing peripheral portions of the liquid coated wires. This will cause the fine particles in the air, which are not passing through the meshes, to adhere to the latter portions of the wires. Substantially all of the soot and other particles in the air will adhere to the liquid covered surfaces of the belt and eliminate them from the air before it leaves the casing C. The belt will carry these products into the bath which will remove them from the belt. Any products, that will not be removed by their passage through the bath, will be wiped from the belt by brushes $c^{20}$, $c^{21}$. From the chamber $c$, the air will pass out through inlet $c^{10}$ to the chamber $b$ and thence upwardly to the blower 12.

A column of water is maintained in the lower portion of the casing. A pipe $b^2$ delivers water to the casing under control of a valve $b^3$ which is automatically operated by a float $b^4$ to keep the water at a substantially predetermined level. An overflow pipe $b^5$ is provided to carry off any excess of water in event valve $b^3$ fails to operate or when the washer is used to cool air, as hereinafter set forth. A deflector or splash plate 40 extends around the sides of the chamber $b$ above the water column.

A centrifugal drum $b^6$ is secured to the lower end of a shaft $b^{60}$ which is connected to be driven by the shaft of the rotor 12$^a$, the drum being coaxial with the blower 12 and the motor 13, so that it may be directly driven without gearing. The drum $b^6$ is in the general form of an inverted cone, and is adapted to project water in a very finely divided spray or mist, horizontally across the chamber $b$, through which the upwardly travelling air must pass in transit through the chamber $b$ of the casing. This drum receives water into its lower end or apex through holes $b^8$ in a sleeve $b^{80}$ which extends upwardly from the lower end of the drum and is attached to the shaft $b^{60}$. Sleeve $b^{80}$ is rotatable around the tubular extension 14 of a fitting which has a flange 15 which is fixedly secured to the bottom of the casing. An opening 16, in sleeve 14, admits water to the ingress holes $b^8$, the lower end of the drum being submerged for that purpose. A sleeve-valve 17 fits around the sleeve 14 and is provided with an opening 18 which is adapted to be brought into partial or complete registry with the opening 16 to regulate or control the admission of water from the column in the bottom of the casing to the drum $b^6$. A handle 19 is provided on the sleeve-valve 17, so it may be rotated. Water entering the reduced lower end of the rapidly rotating drum $b^6$ will be subjected to centrifugal force which will distribute it throughout the area of the drum and force it upwardly in the drum to fine perforations $b^9$, through which the water will be discharged laterally by centrifugal force. The discharged water forms a substantially continuous spray or mist between the drum and the sides of the casing, to efficiently wash the air passing upwardly therethrough. The air after passing through the centrifugal spray carries water upward in the form of a dense fog or mist above the drum. The water projected outwardly by the centrifugal drum and not carried upwardly with the air will drop into the column of water in the bottom of the casing. A deflector 41 directs the air from inlet $c^{10}$ under zone of centrifugal discharge, and prevents water from dripping into the chamber $c$.

A fixed baffle D made of fine wire screen extends across the chamber $b$ above the centrifugal drum to eliminate the free water in the air. This screen is formed of very fine wire netting and being constantly coated with water from spray or mist serves to both continue to wash and collect free water. A characteristic of forcing air through this baffle formed of fine woven wire screen is that the air being drawn upwardly by the blower 12 at considerable velocity strikes against the downwardly facing peripheral portions of the wire which will divide and deflect the air through the meshes or openings between the wires. The air passing around the wires at this velocity will produce eddies adjacent the opposite or upwardly facing peripheral portions of the wires, and these eddies will cause the air passing around the wires to deposit the free water and finer impurities not already collected on the latter peripheral portions of the wires. This screen is bent into zigzag form as illustrated so as to increase its superficial area without excessive retardation of the air, and so that the planes of the different portions of the baffle will extend obliquely to the direction of the air current and to direct the air through the meshes so as to prevent the water from filming in the meshes and to more efficiently eliminate the free water. This formation produces a series of acute angled portions on which the water will be deposited, as aforesaid, and on which it will run downwardly to the lower apices of the angles of the screen and from there it will drop downwardly in the chamber $b$.

At times, it is desirable to additionally eliminate water from the air and to vary or regulate the humidity of the air passing to the blower. For this purpose, a pair of movable baffles $D'$ and $D^2$ are provided to eliminate the free water which is carried upwardly by the air from the baffle D. Each of the baffles $D'$, $D^2$ consists of a strip of wire netting $d^3$ bent into zigzag form, similarly to the baffles D, to form a succession of portions connected by lower acute angles $d^6$, to operate similarly to the baffle D. Each baffle $D'$, $D^2$ is centrally fixed to a shaft $d^4$, which extends across the upper portion of the casing B, and is provided with a handle $d^5$ on the outside of the casing, so that each of these baffles may be turned to extend into operative position, as shown by full lines, or into inoperative position. When these baffles are positioned horizontally, they will be effective to arrest the free water in the air, and when turned into a vertical position, they will be substantially ineffective for that purpose. When these baffles are in their operative position, they will lessen the humidity of the air passing to the blower, and when in their inoperative position, the humidity of the air passing to the blower will not be lessened. These rotatable baffles exemplify means for varying the humidity of the air passing from the casing B.

In some instances, it is desired to additionally cool the air and to reduce its humidity, and for that purpose a coil of copper pipe E, consisting of several serially connected horizontally convoluted superposed coils $e$, is disposed in the casing B above the centrifugal drum and below the fixed baffle D. The upper coil of this pipe is connected to receive water, usually of normal temperature, which is cooler than the air, through a pipe $e'$ from a box $e^3$, and the lower coil is extended, as at $e^2$, to discharge the water into the centrifugal drum, from which it will be discharged by centrifugal force and projected laterally. Coils $e$ act at all times as baffles to eliminate the free water between the baffles D and the centrifugal drum. When the cool water is flowing through these coils, they will cool the upward current in chamber $b$, and the surplus humidity, caused by lowering temperature of air employed, will condense on the outside thereof. When the water is flowing through the cooling coils, the sleeve valve 17 may be closed, so that the water discharged from the coils will be projected across the chamber $b$ by the centrifugal drum $b^6$. If desired, water which has been chilled may be passed through the coils. When purified air is to be heated before distribution, the water is not passed from the coils $e$. If additional moisture or more water for washing and cooling is desired, without humidity reduction, an additional supply of water may be discharged directly into the centrifugal drum through a pipe $b^{16}$ from the box $e^3$. Water is supplied to said box through a pipe $b^{12}$ under control of a valve $b^{17}$. A pivoted deflector $b^{15}$ in said box is adapted to direct the water into drum $b^6$, either through pipe $b^{16}$, or through the pipe $e'$, which delivers the water to the cooling pipe E. When an increase of water is desired for washing and cooling, without the humidity reduction produced by water flowing through the coils $e$, the deflector $b^{15}$ is set to direct water into pipe $b^{16}$. This exemplifies apparatus in the washing chamber for eliminating humidity and cooling air when desired, for controllably delivering water to the centrifugal drum, and in which the coils $e$ assist in eliminating the free water from the air after it has passed across the centrifugally projected water.

In transit through the casing, the air will pass through or across the spray or mist which is forcibly projected laterally across the chamber $b$ by the centrifugal drum $b^6$. The upward current of air produces a fog or mist above the drum and the coil-pipe E, and baffle D will arrest the free water in the air before it reaches the blower 12 for distribution. If this baffling is insufficient, the baffles $D'$ and $D^2$ are shifted into their operative position. The humidity of the air passing to the blower may be regulated by baffles $D'$ and $D^2$. If it is desired to cool the air, the deflector $b^{15}$ is set to direct cold water into the pipe E, to cool the air in transit to the blower. The humidity reduction, caused by water passing through coils $e$, may be controlled by setting the deflector $b^{15}$ to direct water directly into the drum $b^6$, thereby increasing the humidity.

The invention provides for automatically and accurately controlling the humidity of the air delivered into the rooms by a regulator which controls the delivery of sufficient water into the washed air through a pipe $m^8$ which discharges into the blower 12, to accurately make up any deficiency in moisture under varying conditions. The regulator comprises a suitable back or panel $h$ which is adapted to be secured at any desired or convenient point to a wall in the room which is subject to temperature and humidity changes. The regulator also comprises thermally responsive elements K and $K'$ which are substantially parallel. Each of these elements is composed of strips having different co-efficients of expansion. These strips are secured together in any manner well understood in the art, so that they will flex responsively to temperature changes. The lower end of the element K is secured at $k^2$ to one side of a fixed U-shaped bracket $h^5$, and the other element $K'$ is secured, at $k^6$, to the other side of said bracket. The elements extend vertically upward from said fixed bracket and are normally in substantially parallel relation. The upper ends of said elements are free to move laterally responsively to their flexure by temperature changes.

The upper end of element K is pivoted at $k^{11}$ to the vertical arm of a bell-crank lever $k^9$. The horizontal arm of said lever is pivoted at $k^{10}$ to the upper end of a controller rod $m^9$. The bell-crank lever is pivoted at $k^{13}$ to one end of a stiff cross-link $k^7$, the other end of which is pivoted at $k^{14}$ to the upper end of element K'. This construction permits the lever $k^9$ to fulcrum, either at pivot $k^{11}$ or pivot $k^{13}$, and permits the upper ends of the elements K, K' to move differentially or relatively to each other in either direction. Any relative movement between the upper ends of said elements, as the result of the flexure of either or both, causes the lever $k^9$ to be rocked about one or the other of said fulcra. The rocking movement of this lever $k^9$ is utilized to operate a controller rod $m^9$ for a humidity-controlling instrumentality and also to operate a visual humidity-indicator.

To produce differential or relative movement between the elements K, K', responsively to humidity changes in the air around the regulator, and to correspondingly operate lever $k^9$, element K is moistened by a wick $k^{12}$, the lower free end of which is extended into a body of water in a reservoir $m$, so that the wick will be kept wet, the evaporation of which will cool said element in proportion to the dryness of the air. The wick is lapped around one edge and the sides of the outer faces of element K and is suitably held thereon.

Reservoir $m$ is formed in a base $h^4$ and is adapted to contain a column of water for delivery to an air system to regulate its humidity. Water in receptacle $m$ is kept at a substantially uniform level by means of a float $m'$ which is attached to an upwardly seating valve $m^2$ which controls the ingress of water to the receptacle from a supply pipe $m^3$. An overflow pipe $m^4$ prevents an excess of water in said receptacle in event the float fails to operate. The delivery of water from receptacle $m$ through a pipe $m^5$ to blower 12, to supply moisture to the air delivered by the system, is controlled by a valve $m^6$ which is operated by controller rod $m^9$ and is adapted to seat on the upper end of a nipple $m^7$ which is screw-threaded to the bottom of the receptacle $m$. A handle $m^8$ is fixed to the nipple $m^7$, so that the nipple, by turning it, may be adjusted relatively to the valve $m^6$ for the purpose of maintaining relative humidity at a higher or lower percentage. Pipe $m^5$ may be flexible, to permit the nipple to be turned for this purpose. Valve $m^6$ is connected to the lower end of rod $m^9$ which is operated by lever $k^9$. Rod $m^9$ exemplifies a controlling device for the valve $m^6$, to control the supply of water to regulate the humidity of the air. In some instances, it is desired to control a motor magnet or some other suitable device for producing humidity. For this purpose, a member $n$ is applied to the controller rod $m^9$ to operate between adjustable switch or screw contacts $n'$ so that an electric circuit will be properly controlled by said rod. At the water line in the reservoir in base $h^4$, rod $m^9$ which is formed of sections has a coupling 80 of low heat conductivity or of suitable non-expanding material, so the length of the rod will not be affected by the temperature of the water in said reservoir. A cover $h^{40}$ of material of low thermal conductivity is provided for reservoir $m$ to prevent the temperature of the water in said reservoir from influencing the elements K, K'.

An indicator needle S is rigid with and extends downwardly from the horizontal arm of bell-crank lever $k^9$. Its lower end is adapted to swing across a calibrated scale $s^2$ adjacent a slot $s'$ in a cover $h^8$ to give visual indications of the degree of humidity in the room where the regulator is placed responsively to the control of lever $k^9$ by the elements K, K'.

In response to temperature changes, the elements K, K' will move differentially by reason of the cooling of the element K by evaporation of the moisture in wick $k^{12}$. When the humidity is too low, the evaporation of moisture from wick $k^{12}$ will be rapid, which will cause the element K to flex to the left, relatively to the element K'. This relative movement of elements K, K' will cause the lever $k^9$ to discharge water responsively to the deficiency in the humidity of the room until the air has the desired humidity, whereupon the evaporation of moisture will be retarded and element K will pass back to its normal position. When the temperature around the regulator is lowered, both of the elements K, K' will flex to the left, according to the degree of temperature change, and when the temperature increases above normal, both of the elements will flex to the right. At all times, the element K will be responsive to temperature changes with the element K' and will be differentially responsive relatively to element K' as the result of the influence of evaporation upon it, and lever $k^9$ will always be operated responsively to this differential movement of the elements.

When temperatures are low, the amount of moisture necessary to give the desired humidity percentage to the air is less than that necessary to give the desired humidity in high temperatures. For example, with wet and dry bulb thermometers, comparative tests show that at a temperature of 70° Fahr., the wet bulb should be at sixty degrees to give fifty-six per cent humidity, or a difference of ten degrees between the registrations of wet and dry bulbs, while at six degrees lower (64° Fahr.) nine degrees difference between such bulbs gives fifty-six per cent humidity and six degrees higher temperature (76° Fahr.) eleven degrees difference in the bulb registration will give fifty-six per cent humidity. To compensate for these variations, the thermally responsive elements K, K' are made of correct thickness and of such relative length that element K will flex relatively to element K' one point for every six degrees of change in temperature. This relative shift of the elements will correspondingly rock the lever $k^9$ to operate the controller rod $m^9$ and correspondingly shift the valve $m^6$ to vary the volume of water delivered through pipe $m^5$ for humidifying the air in the proportions desired under different temperatures. Thus, this differential operation of elements K, K' automatically compensates for the different proportions of moisture required to maintain the desired percentage of humidity at all temperatures. The body movement of the lever $k^9$, resulting from the conjoint movement of the elements K, K' responsively to temperature changes, moves the needle S to correct the reading on the scale $s^2$ one point for every six degrees of changes of temperature. As a result, the needle S provides a single visual indicator which will give the correct reading of the humidity under different temperatures in the room where the regulator is located.

A cover-plate $h^8$ is provided to protect the front of the elements and the controller bar and has its lower margin fitted around the base $h^4$, so that it may be removed when access to the parts therein is desired. This cover is provided with openings $h^{80}$ for circulation of air around the elements K, K'.

For convenience in controlling the temperature of the air from the point at which the humidity is controlled, a thermostat, comprising a thermally responsive element T, is associated with the regulator. Said element has its lower end fixed at $t$ to the lower portion of an arm $t'$ which is pivoted at $t^2$ to the panel $h$. The free end of element T is adapted to engage contacts $t^3$, $t^4$ which may be connected to control an electrical instrument for controlling the temperatures of the air in any suitable or well known manner. The arm $t'$ is manually operable by a pin $t^5$ which extends between pins $t^6$ on the lower end of arm $t'$ and is fixed to a shaft $t^7$ which is provided at its front end with an arm $t^8$, the position of which is indicated by a scale $t^9$. By shifting arm $t^8$, the neutral portion of element T may be changed to vary the temperatures at which the circuit through contacts $t^3$, $t^4$ will be closed. A thermometer $u$ is mounted on the front of the cover $h$. This humidity regulator exemplifies one which is controlled by a plurality of differentially operating thermally responsive elements; also one in which the humidity is held at any desired percentage, regardless of temperature; also one in which provision is made for a visual indicator which is adapted to indicate the percentage of humidity under different temperatures.

The operation of the improved air supply system will be as follows: When, as in cold weather, heated air is to be supplied to the rooms in the building, air valve 34 in the distributing trunk 30 will be closed and valve 32 will be set to direct air from the trunk $a^6$ into the duct $a^2$ of the heater A. Valve $f^3$ in the intake $f^2$ will be set to admit the desired portion of the air to the inlet trunk $f$, the remainder entering said trunk $f$ through the register $f'$. At such time, the valve $b^{17}$ will be closed, so that no water will flow through the cooling pipe E in the washer. When the motor 13 is in operation, air will be drawn from the inlet trunk $f$ downwardly through chamber $c$ and through the several reaches of the travelling endless belt $c^3$, to remove the soot, other products of combustion and the like from the air. From chamber $c$, the air will be drawn by the blower 12 upwardly through the washer and into the casing of the blower. From the blower, the air will be discharged and forced through flexible pipe 10, trunk $a^6$, heater duct $a^2$, outlet duct $a^3$ and the distributing trunk 30 to the distributing branches 31, which will deliver it to the several places in the building where desired. In transit through the heater duct $a^2$, the temperature of the air will be raised to the desired point, the humidity of the air will be accurately controlled to make up any deficiency in moisture under different temperatures by the operation of the thermostatic regulator which variably controls the delivery of water from the reservoir $h^4$ to the blower casing, so that the heated air distributed will at all times be of proper humidity. In transit through the chamber $b$, the air will be thoroughly washed and the free water will be removed by the baffles before it enters the blower casing 12 for delivery in its passage to the heater and distributing line. By setting the baffles $D'$, $D^2$ into or out of operative position, the humidity of the air entering the blower may be varied to meet different conditions. If a greater volume of water is necessary, to effect thorough washing of the air, than is fed into the drum from the water column in the bottom of chamber $b$, it may be supplied to the drum through the pipe $b^{16}$ under control of the valve $b^{17}$ and the deflector $b^{15}$.

When it is desired to distribute cool air, as in warm weather, valve 34 will be shifted to close the outlet duct $a^3$ of the heater and and valve 32 will be set to direct air directly from the trunk $a^6$ into the distributing trunk 30. At the same time, valve $g^6$ will be set into position shown in dotted lines (Fig. 2), so that air will be drawn from the basement of the building through the underground loop $q^2$ into the trunk $q^4$, and water will be supplied through pipe $e'$ to the cooling pipe E under control of the deflector $b^{15}$ and valve $b^{17}$. When the motor is then operated, cool air will enter the trunk $f$, be purified in transit through the chamber $c$, washed in transit through the chamber $b$, and cooled from contact with the cooling pipe E, so that cold, purified, washed air will be discharged by the blower into the trunk $a^8$ and thence into the distributing system. At times, the cooling will be sufficient without water flowing through the cooling pipe E. The apparatus may also be used without drawing air from the underground loop $g^2$, if desired. Under all conditions, the thermostatic regulator H will accurately control the humidity of the air delivered into the distributing ducts, so that it will be both clean and of the proper humidity.

The invention exemplifies an air supply system which is well adapted for use in households, hot houses and other buildings. The apparatus is simple and can be produced at a low cost. It is adapted to furnish, or circulate through a building, air which is clean at all times and of the proper humidity.

The invention is not to be understood as restricted to the details set forth, since these may be modified within the scope of the appended claims, without departing from the spirit and scope of the invention.

Having thus described the invention, what I claim as new, and desire to secure by Letters Patent, is:

1. In an air supply system for buildings, the combination of a distributing duct, a heater connected to discharge air to said duct, an air-washer embodying a driven element, means for forcing air successively through the washer, the heater and said duct, and a motor for driving the air forcing means and washer.

2. In an air supply system for buildings, the combination of a distributing duct, a heater connected to discharge air to said duct, an air-washer, comprising a driven element and a casing separate from the heater, means for forcing air successively through the washer, the heater and said duct, and a motor for driving the air forcing means and washer, mounted on the washer-casing.

3. In an air supply system for buildings, the combination of a distributing duct, a heater connected to discharge air to said duct, an air-washer comprising a driven element and a casing, an air-purifier comprising a travelling belt, means for forcing air through the purifier, washer, heater and said duct, and a motor for driving the air forcing means and washer mounted on the casing.

4. In an air supply system for buildings, the combination of a distributing duct, a heater connected to discharge air to said duct, an air washer comprising a casing and a centrifugal projector, a blower for forcing air through the washer, the heater and said duct, a motor connected to drive the blower and projector mounted on the washer, and a connection between the blower and the heater comprising a flexible pipe section to prevent sound conduction from the motor, blower and washer to the heater and the duct.

5. In an air supply system for buildings, the combination of a distributing duct, an air-intake, a purifier comprising an oiled element, for removing products from the air, an air-washer, to which the air passes from the purifier, and means for forcing air through the washer and said duct.

6. In an air supply system for buildings, the combination of a distributing duct, an air-intake, a purifier comprising a travelling element having a liquid applied thereto for removing products from the air, an air-washer, to which the air passes from the purifier, means for forcing the air through the washer and said duct, and a motor connected to drive said oiled element, the washer and said forcing means.

7. In an air supply system for buildings, the combination of a distributing duct, an air intake, a heater, a purifier comprising an oiled element for removing products from the air, an air-washer, to which the air passes from the purifier, and means for forcing the air through the element, washer, heater and said duct.

8. In an air supply system for buildings, the combination of a distributing duct, an air-intake, a heater, a purifier comprising an oiled element for removing products from the air, an air-washer comprising a centrifugal drum to which the air passes from the purifier, a blower for forcing the air through the washer, heater, oiled element and said duct, and a motor connected to drive said oiled element, the blower and the drum.

9. In an air supply system for buildings, the combination of a distributing duct, an air-intake, a heater, an air-washer comprising a casing and a centrifugal projector, a blower for forcing air through the washer, heater and said duct mounted on said casing, and a motor supported on said casing and connected to drive said blower and said projector.

10. In an air supply system for buildings, the combination of a distributing duct, an air intake, a heater, an air purifier comprising a travelling screen, an air-washer comprising a casing and a centrifugal drum, a blower for forcing air through the washer, heater, screen and said duct, and a motor connected to drive said blower, drum and screen.

Signed at Chicago, Illinois, this 13th day of April, 1926.

GEORGE R. LAWRENCE.